(No Model.)
O. B. BANNISTER.
VEHICLE HUB.
No. 495,290. Patented Apr. 11, 1893.
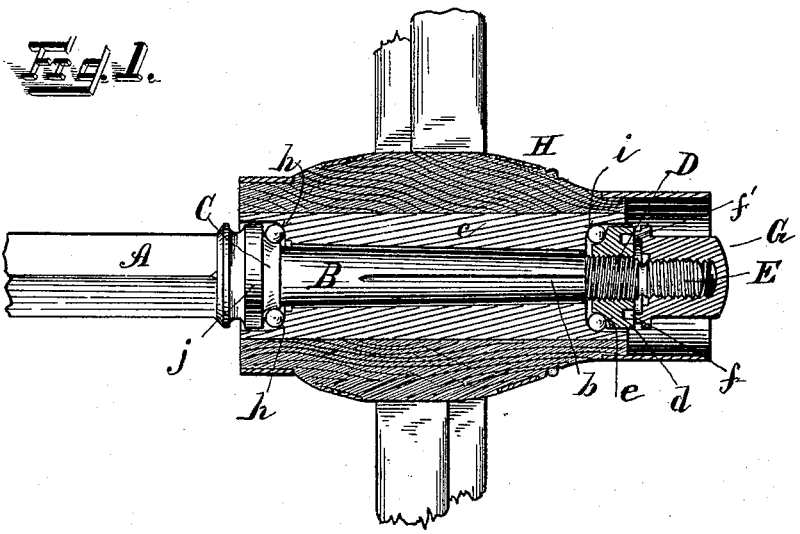
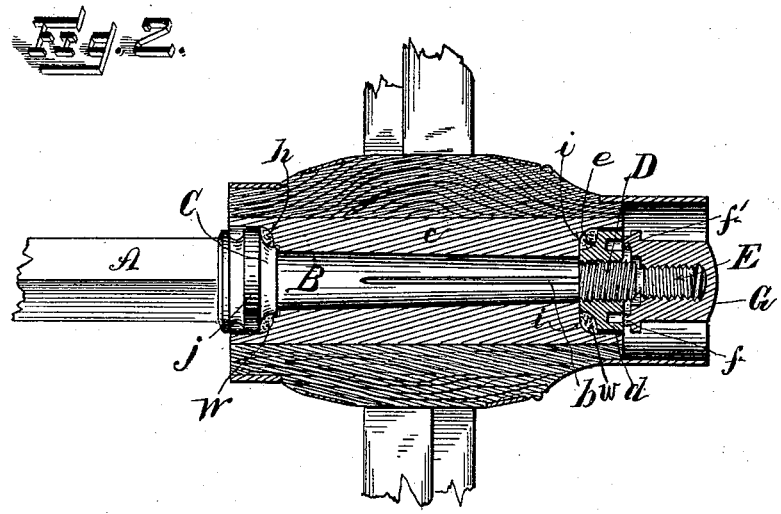
WITNESSES
T. W. Bradford
F. Clough
INVENTOR
Oscar B. Bannister
by Parker & Burton
Attorneys.

UNITED STATES PATENT OFFICE.

OSCAR B. BANNISTER, OF JACKSON, MICHIGAN.

VEHICLE-HUB.

SPECIFICATION forming part of Letters Patent No. 495,290, dated April 11, 1893.

Application filed November 11, 1892. Serial No. 451,635. (No model.)

*To all whom it may concern:*

Be it known that I, OSCAR B. BANNISTER, a citizen of the United States, residing at Jackson, county of Jackson, State of Michigan, have invented a certain new and useful Improvement in Vehicle-Hubs; and I declare the following to be a full, clear, and exact description of the invention, such as will enable others skilled in the art to which it pertains to make and use the same, reference being had to the accompanying drawings, which form a part of this specification.

This invention relates to vehicle wheels, and has for its object an improvement in the co-acting parts of the hub and axle end, whereby the same wheel may be used at will, in connection with the same axle and either with or without a number of interposed bearing balls; the object being to enable the user to employ ball bearings generally but should accident happen to one or more of the bearing balls, cones or curves on which they run all the balls may be taken out and the wheel and axle used without them.

In the drawings, Figure 1, shows the end of the axle, and shows in section the hub of a wheel engaging therewith, the two being separated by bearing balls. Fig. 2, shows the same axle and hub, without the interposed bearing balls.

The end of the axle A, is finished with a conical journal B, at the inner end of which is a ball bearing collar C, and terminating at the outer end is a right hand screw D, and a left hand screw E. The conical journal B, is provided with the usual oil duct $b$. Upon the inner end of the screw threads D, is screwed a nut $d$, provided on its inner side with a ball bearing shoulder $e$. The nut $e$, has a circular periphery which forms a bearing for the end of the bushing which forms the end of the hub as hereinafter described. The nut $d$, is turned on the screw D, by a pronged wrench that engages in wrench holes $f, f'$; the outer screw E, supports a cap nut G, which operates both as a set nut securing the nut $d$, and as a cover finishing and protecting the end of the axle.

Within the hub of the wheel H, is inserted a bushing $c$, having a conical hole through it; at the inner end of the bushing $c$, is a bearing shoulder $h$, and at the other end of the bushing $c$, is a second bearing shoulder $i$; at both the inner and the outer ends of the walls of the bushing are pronged beyond the bearing shoulders so as to cover the collar $j$, at the inner end and the nut $d$, at the outer end. Between the bearing shoulders C, $h$, and $e$, $i$, can be inserted a number of spherical balls of hardened steel, thus forming a ball bearing hub and axle. When the hub and axle are thus used with interposed friction balls the bushing $c$, is held entirely free from the spindle B, and bears on the balls only. If for any reason it becomes desirable at any time to remove the spherical balls, and employ the hub and axle as a cone bearing axle, the nuts D and E, are removed and between the bearing C, $h$, is inserted a washer W, of any suitable material, as of metal or of leather. A similar washer W, is placed between the bearings $e$, $i$, and the nut $d$, turned down upon it; the washer W, at the inner end of the bearing is made thin enough to allow the hub to slip farther on to the axle than it could when the balls are in place, and thus bring the inner and outer cones of the hub and axle into engagement utilizing the coned bearing between the hub and the axle and thus enabling the user to employ with the same wheel and axle, either a coned bearing or a ball bearing as occasion may require.

What I claim is—

In a hub and axle, the combination of a coned axle, provided with a ball bearing socket, a hub-box provided with ball bearing sockets at both ends, a securing nut and washers adapted to fill the spaces between said sockets, substantially as and for the purpose specified.

In testimony whereof I sign this specification in the presence of two witnesses.

OSCAR B. BANNISTER.

Witnesses:
EDWIN S. ANDERSON,
W. S. COBB.